United States Patent [19]

Koyama et al.

[11] Patent Number: 5,315,502
[45] Date of Patent: May 24, 1994

[54] PLANT OPERATION SUPPORT APPARATUS AND METHOD USING EXPERT SYSTEMS

[75] Inventors: Kenji Koyama; Shoichi Uchihara, both of Hyogo, Japan

[73] Assignee: Mitsubishi Denki Kabushiki Kaisha, Tokyo, Japan

[21] Appl. No.: 534,089

[22] Filed: Jun. 6, 1990

[30] Foreign Application Priority Data

| Jun. 9, 1989 | [JP] | Japan | 1-148086 |
| Jun. 15, 1989 | [JP] | Japan | 1-154903 |
| Jun. 21, 1989 | [JP] | Japan | 1-158778 |
| Jul. 14, 1989 | [JP] | Japan | 1-183229 |
| Jul. 14, 1989 | [JP] | Japan | 1-183230 |
| Apr. 27, 1990 | [JP] | Japan | 2-113551 |

[51] Int. Cl.$^5$ .................................................. G06F 15/46
[52] U.S. Cl. .................................. 364/184; 364/148; 395/912
[58] Field of Search ........ 364/148, 149, 152, 184–187, 364/550, 551.01; 395/50, 60, 68, 912

[56] References Cited

U.S. PATENT DOCUMENTS

| 4,755,925 | 7/1988 | Tsuchiya et al. | 364/185 |
| 4,967,337 | 10/1990 | English et al. | 364/184 |
| 4,992,928 | 2/1991 | Ishihara et al. | 364/184 |
| 5,023,045 | 6/1991 | Watanabe et al. | 364/148 |
| 5,099,412 | 3/1992 | Kelley | 364/148 |
| 5,101,337 | 3/1992 | Ebizuka | 364/186 |
| 5,195,029 | 3/1993 | Murai et al. | 364/551.01 |
| 5,214,577 | 5/1993 | Sztipanovits et al. | 364/184 |

FOREIGN PATENT DOCUMENTS

| 0377736 | 1/1989 | European Pat. Off. . |
| 0309756 | 4/1989 | European Pat. Off. . |
| 8900726 | 1/1989 | PCT Int'l Appl. . |

OTHER PUBLICATIONS

M. Oki et al., "Substation Operation Support System Which Allows Event-Driven Processing", Proc. of the International Workshop on Artificial Intelligence for Industrial Applications 1988, May 1988, Hitachi City, Japan, pp. 64–69.

Primary Examiner—Jerry Smith
Assistant Examiner—Thomas E. Brown
Attorney, Agent, or Firm—Rothwell, Figg, Ernst & Kurz

[57] ABSTRACT

Disclosed herein is a plant operation supporting method whereby a body of simulation data simulating the data admitted from a plant in error state is used along with a previously prepared body of knowledge to simulate various modes of plant operation and to have appropriate operation guides displayed for verification of the knowledge.

3 Claims, 14 Drawing Sheets

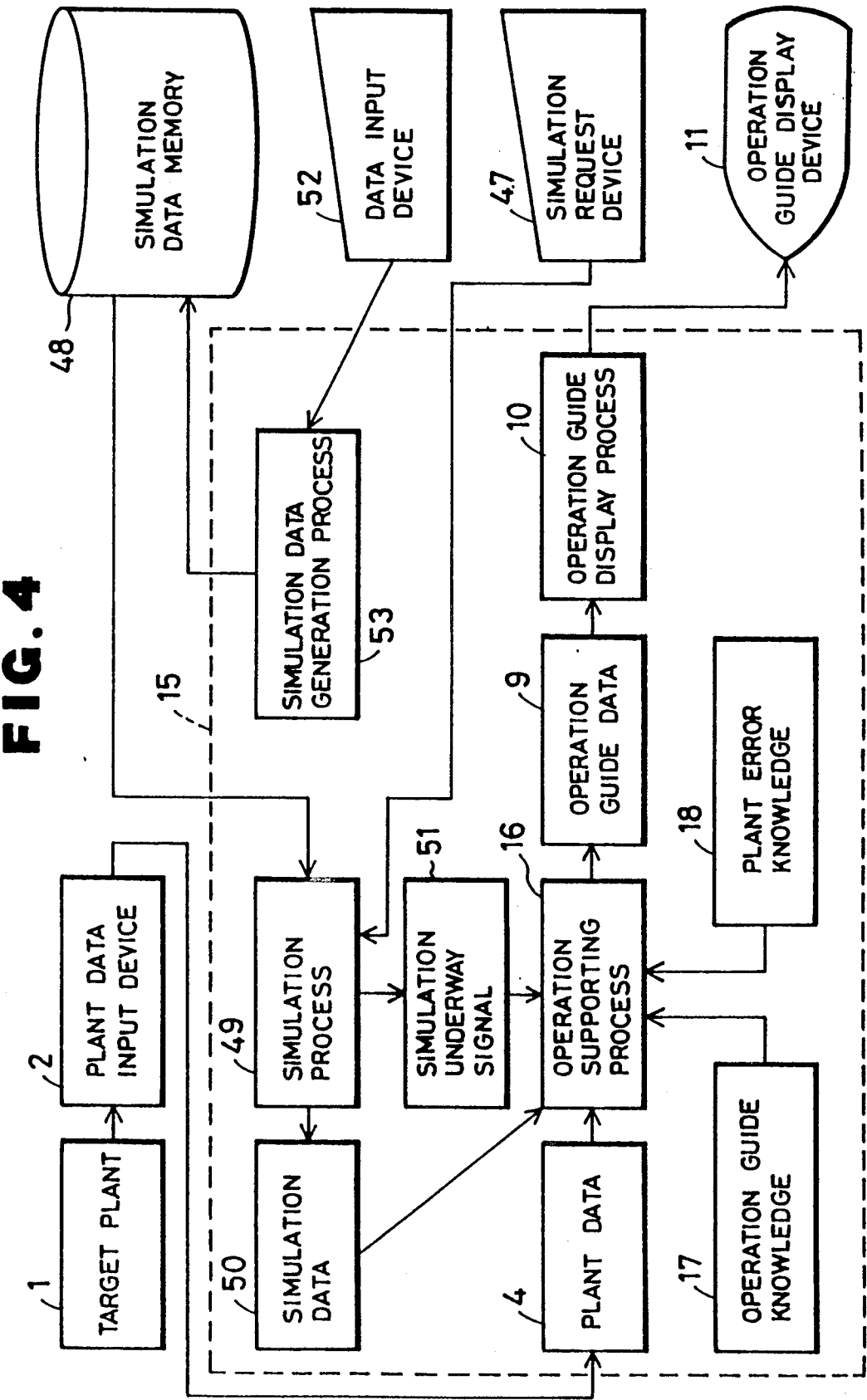

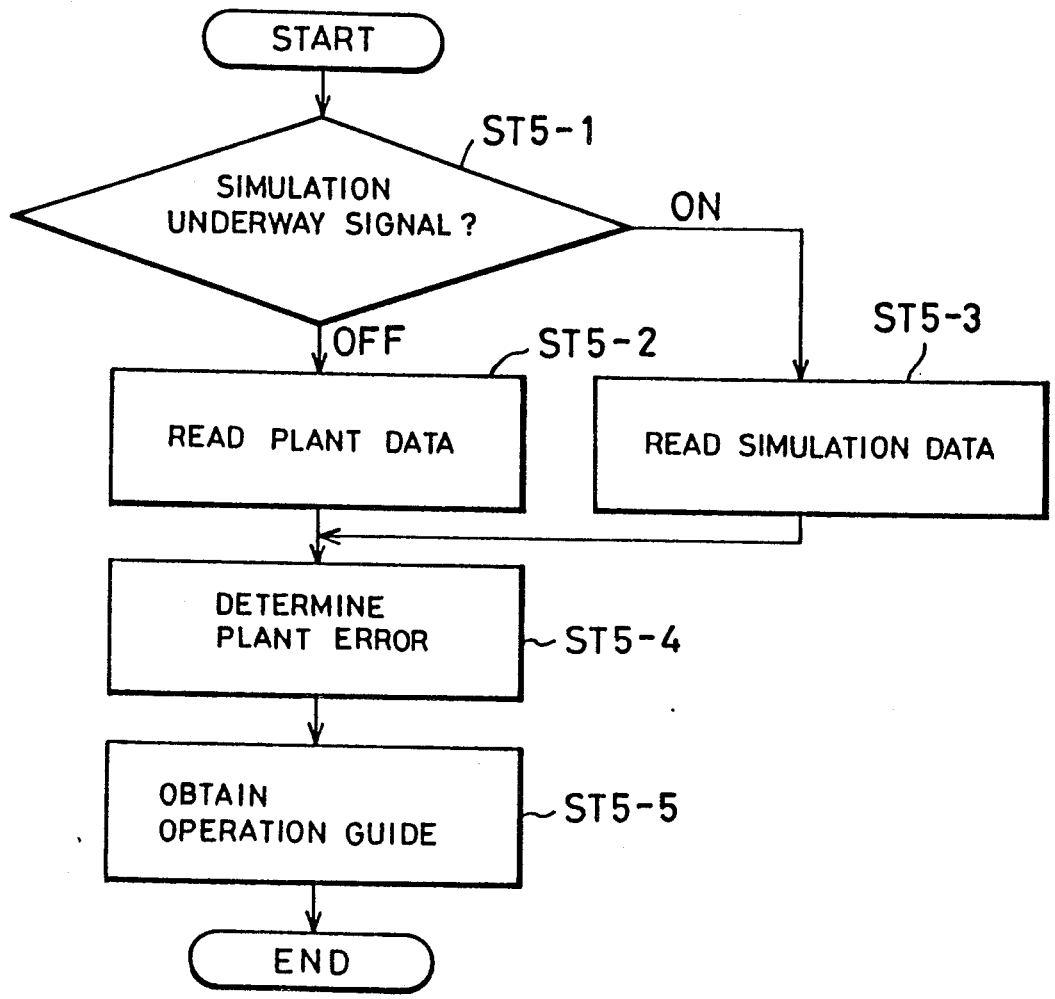
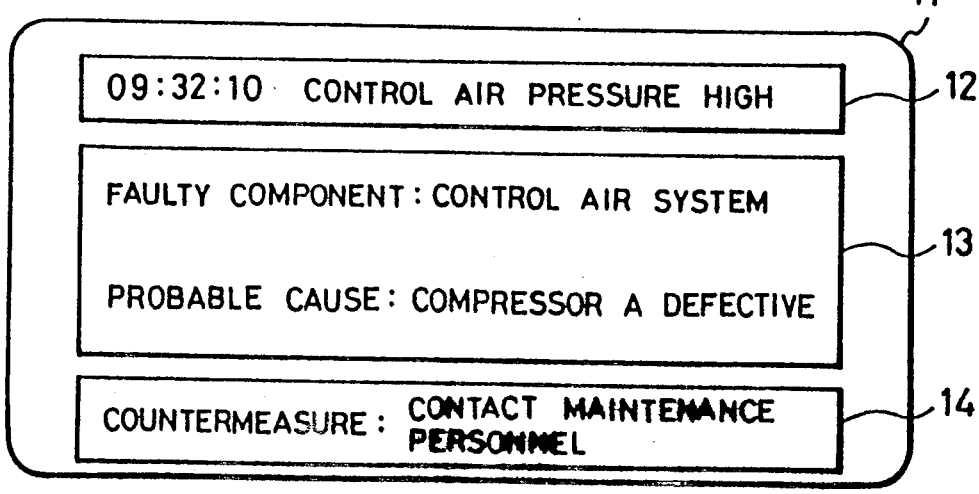

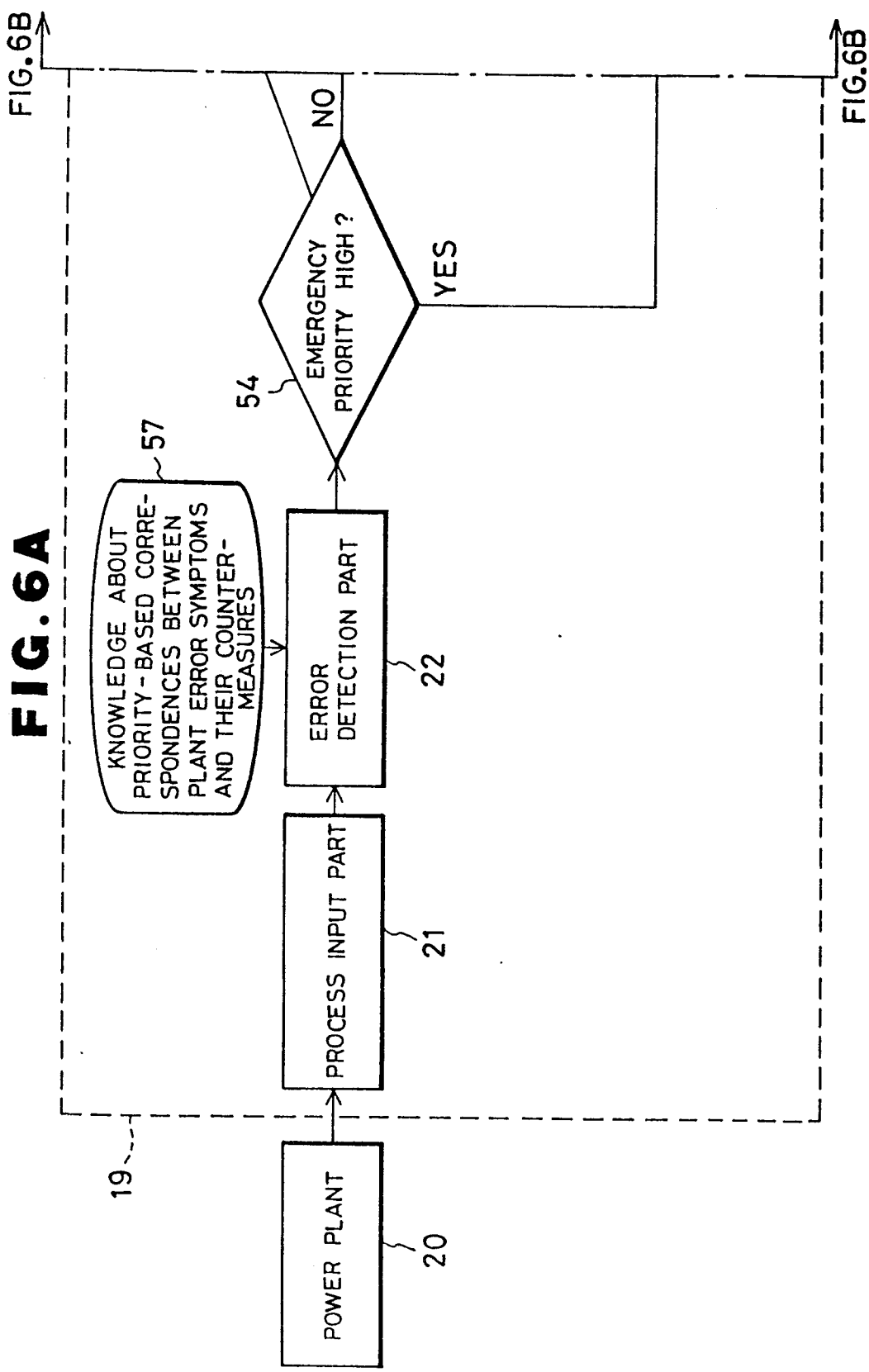

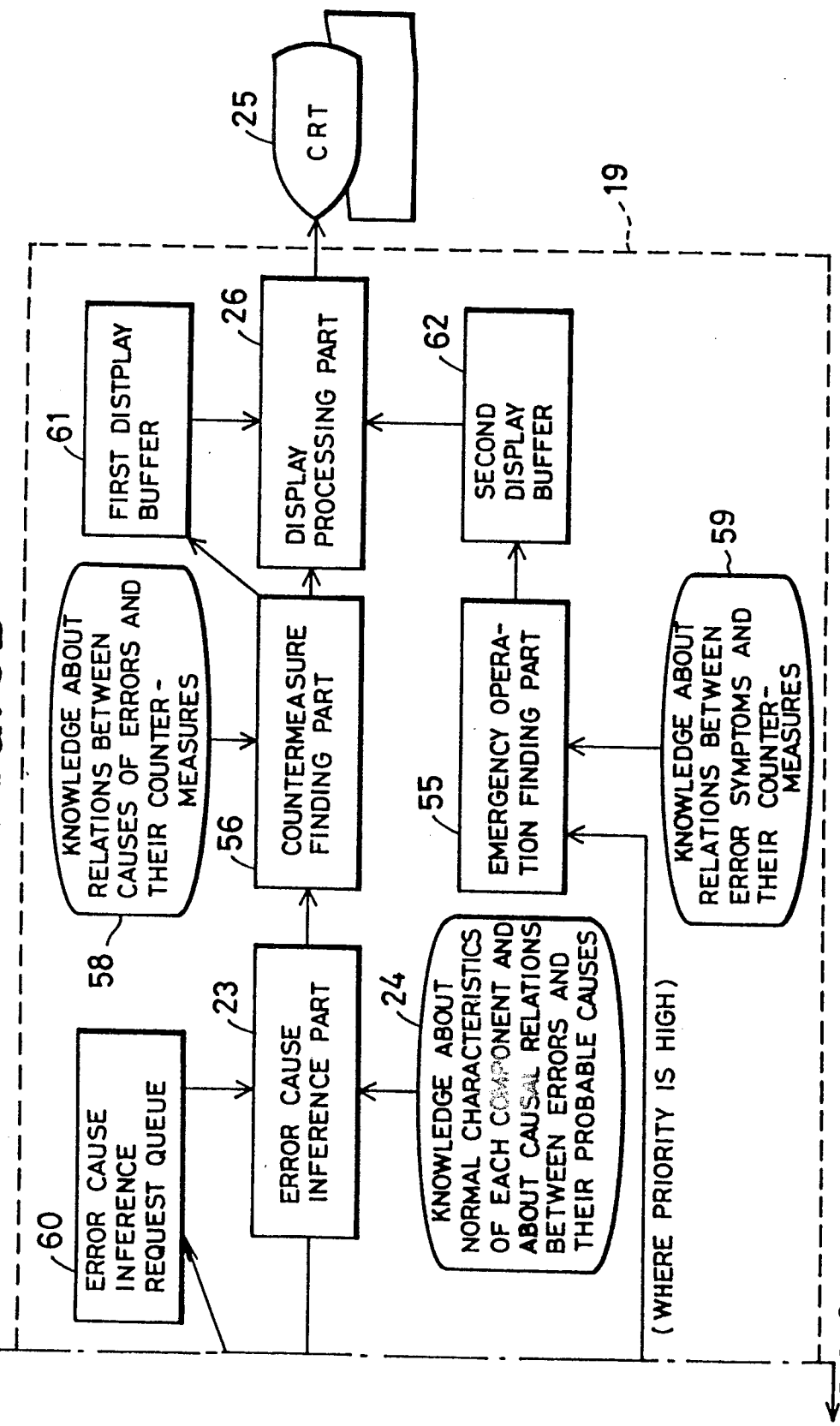

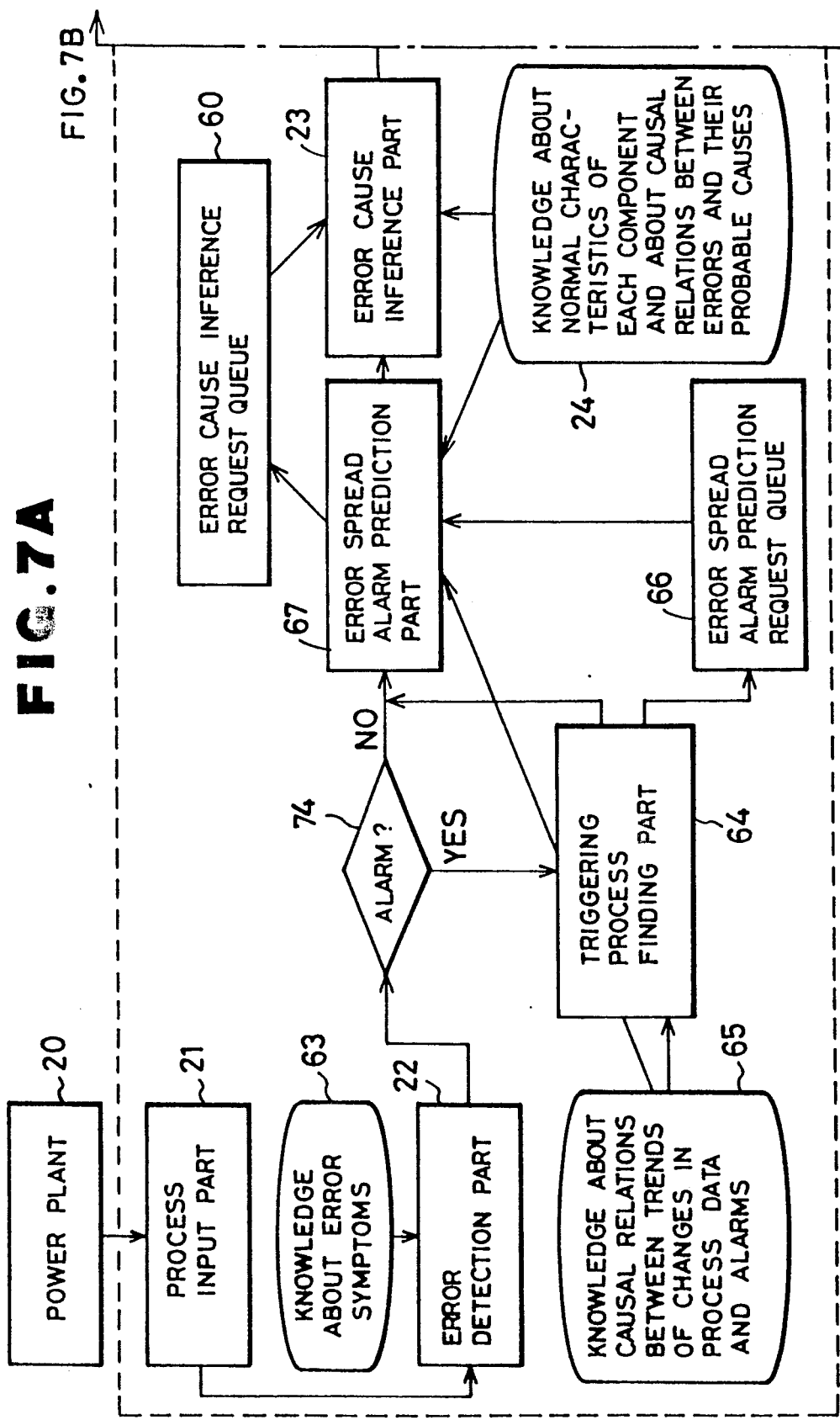

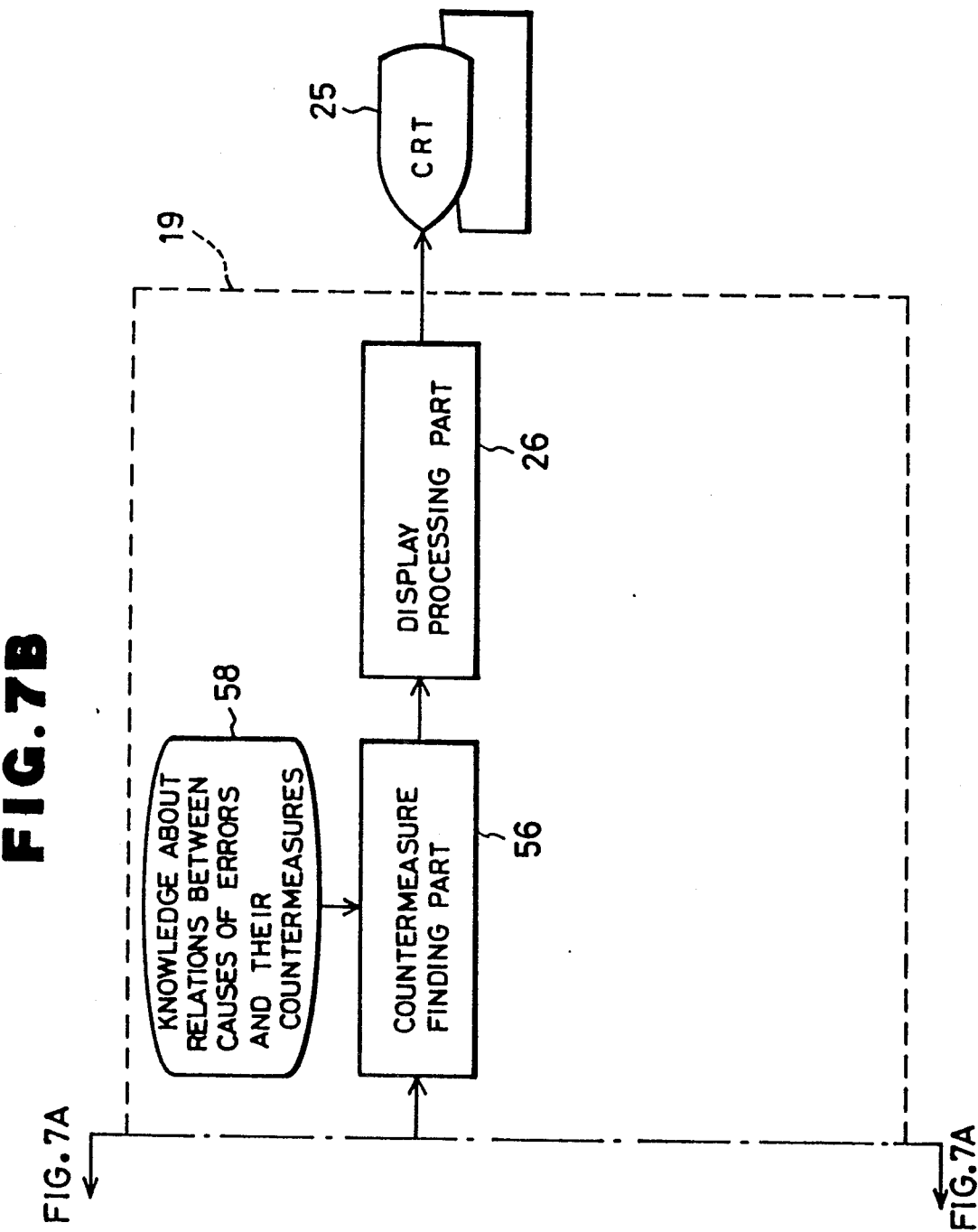

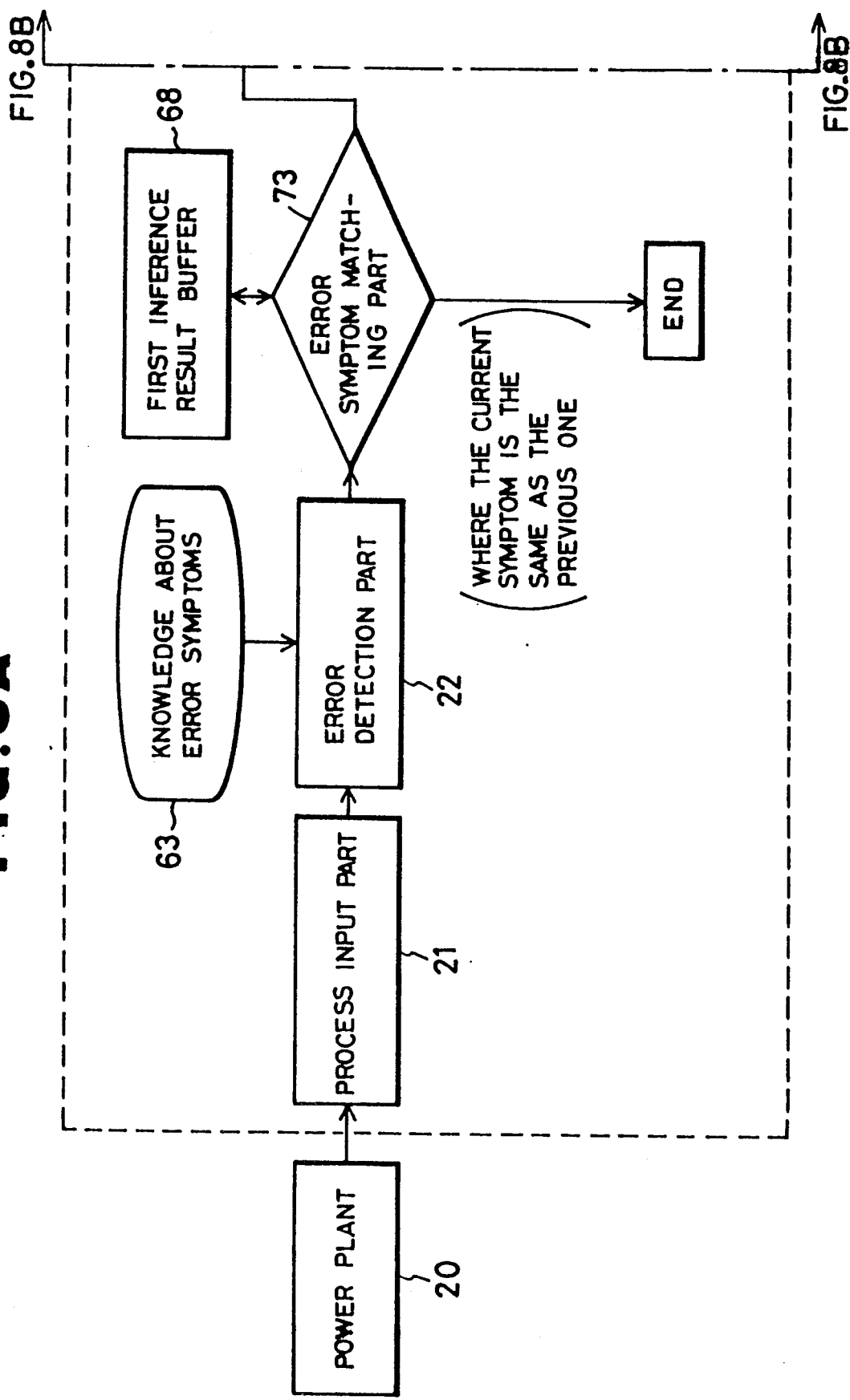

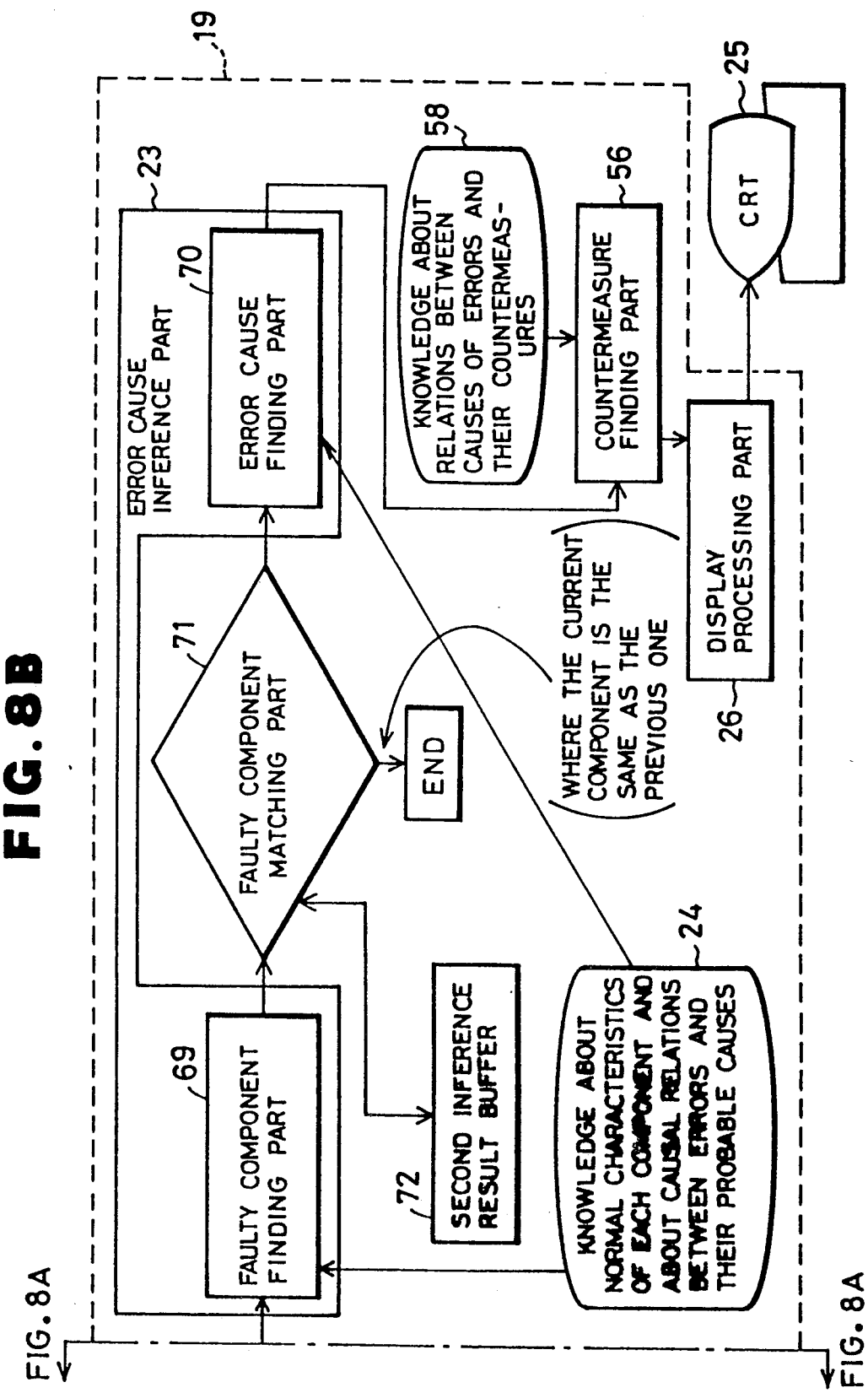

PLANT OPERATION SUPPORT APPARATUS AND METHOD USING EXPERT SYSTEMS

BACKGROUND OF THE INVENTION

The present invention relates to a plant operation supporting method and, more particularly, to a method for supporting operators and maintenance personnel in handling errors that may be encountered in operating continuous processes such as those of a power plant and other industrial and utility plants.

DESCRIPTION OF THE PRIOR ART

FIG. 9 is a schematic diagram of a prior art plant operation supporting method practiced as disclosed in Japanese Patent Laid-open No. 60-147811. In this figure, reference numeral 1 is the target plant to be supported; numeral 2 is a plant data input device through which data on the operation status of the plant 1 is input; numeral 3 is an inference computer; numeral 4 is a body of plant data that is input to the inference computer 3 via the plant data input device 2; numeral 5 is a plant error knowledge whereby a faulty state of the plant 1 is detected out of the plant data 4; numeral 6 is an error-related operation knowledge; numeral 7 is a plant component knowledge; numeral 8 is an inference machine that infers what is wrong with the plant 1; numeral 9 is a body of operation guide data generated by the inference machine; numeral 10 is an operation guide display process; and numeral 11 is an operation guide display device such as a CRT unit.

FIG. 10 is a typical operation guide displayed on the screen of the operation guide display device 11. In this figure, reference numeral 12 is an error symptom message; numeral 13 is an error cause message; and numeral 14 is a countermeasure guide message.

In operation, an error state of the plant 1 is input to the inference computer 3 by the plant data input device 2 as plant data 4. The inference machine 8 detects the error state out of the plant data 4 using the plant error knowledge 5. Then the inference machine 8 determines the probable cause of the error by use of the plant component knowledge 7, and draws accordingly the appropriate operation guide data 9 on the error-related operation knowledge 6. The operation guide display process 10 causes the appropriate error symptom message 12, error cause message 13 and countermeasure guide message 14 to be displayed on the operation guide display device 11.

FIG. 11 is a schematic diagram of another prior art plant operation supporting method practiced as disclosed in Japanese Patent Laid-open No. 60-179806. In FIGS. 9 and 11, like reference characters designate like or corresponding parts, and any repetitive description thereof is omitted. In FIG. 11, reference numeral 15 is a plant operation supporting computer; numeral 16 is a plant operation supporting process; numeral 17 is an error-related operation guide knowledge; and 18 is a plant error knowledge.

In operation, an error state of the plant 1 is input to the operation supporting computer 15 by the plant data input device 2 as plant data 4. The plant operation supporting process 16 infers the status and probable cause of the error as well as the component affected thereby out of the plant data 4 using the plant error knowledge 18, and finds accordingly the appropriate operation guide data 9 based on the operation guide knowledge 17. Then the operation guide display process 10 causes the operation guide data 9 to be displayed on the operation guide display device 11.

FIG. 12 is a schematic diagram of a further prior art plant operation supporting practiced as disclosed in Japanese Patent Laid-open No. 63-120916. In FIG. 12, reference numeral 19 is a computer; numeral 20 is a power plant; numeral 21 is a process input part that reads process data from the power plant 20 into the computer 19; numeral 22 is an error detection part that detects an error from the process data read by the process input part 21; numeral 23 is an error cause inference part that infers the location and probable cause of the error based on both the error symptom detected by the error detection part 22 and on the data read by the process input part 21; numeral 24 is a knowledge base which is provided to each of the plant components and which comprises a knowledge of the characteristics qualitatively and quantitatively representing the normal state thereof as well as a knowledge of causes and effects of probable errors whose symptoms are detected; numeral 25 is a CRT unit; and numeral 26 is a display processing part that outputs the symptom, location, and probable cause of the detected error and the appropriate countermeasures thereagainst to the CRT unit 25.

In operation, the process input part 21 admits data from the power plant 20, and converts the data comprising process quantities into pieces of qualitative data such as "gradual increase" or "constant" for use by the error cause inference part 23. The error detection part 22 monitors the process data that is input through the process input part 21, and detects an error in case of a deviation from the normal range. Upon detection of an error by the error detection part 22, the error cause inference part 23 infers the location and probable cause of the error based on the qualitative and quantitative process data detected. The result of the inference is processed by the display processing part 26 and displayed on the CRT unit 25. The probable cause of the detected error is inferred by use of two kinds of knowledge: the knowledge of the characteristics qualitatively and quantitatively representing the normal state of each plant component, and the knowledge of causes and effects of probable errors whose symptoms are detected.

Practiced in the system shown in FIG. 9, the prior art plant operation supporting method has a major disadvantage: that if the knowledge incorporated in the system contains an error, that error must be detected based solely on the operation guide consisting of the results of inference alone. In this manner, it is difficult to detect any error in the knowledge.

According to another prior art method practiced in the system of FIG. 11, any error in the plant error knowledge entails an erroneous operation guide presented to the plant operators. It is thus necessary to prove that the plant error knowledge is entirely correct. An error in the plant error knowledge is known only after a plant error has caused an erroneous operation guide to be displayed. However, it is often difficult or impractical to produce plant errors deliberately for verification purposes. These constraints make it extremely difficult to verify the plant error knowledge.

One disadvantage of a further prior art method practiced in the system of FIG. 12 is that another error detection process cannot be performed until a complete cycle from error detection to error cause inference to finding of countermeasures is accomplished. That is, no other error symptom can be detected while data external to the system is being supplemented through interaction with the operators. During that period, the process is left unsupervised. Another disadvantage of this prior art method is that the operators are not supplied with relevant support information even if a new error of higher priority occurs halfway through the stage of error cause inference or of finding countermeasures.

With this prior art method, an error is detected upon deviation of the process data from the normal range. Most plant alarm systems have an independent alarm device set up separately from the plant operation supporting system which is typically an expert system, the device being designed to notify the operators of anything unusual associated with the plant. Because the separate alarm device operates independently of the expert system, detection of an error thereby may not be translated immediately into activation of the alarm. That is, an alarm issued by the alarm device may fail to let service personnel investigate and take action against, in a timely manner, what went wrong because of the time lag. It may be too late to give a sufficient support to the plant operators by the time the alarm is sounded. Since there is no way of predicting an alarm based on the current status of the plant, the operators are unable to take preventive measures against an imminent error that would be logically inferred from what is happening now, nor are they able to determine the priority of the detected error or to fully appreciate the result of the inference thereof.

When the process data that is cyclically input for periodic detection of errors and for investigation of the probable causes thereof has relatively few changes, the result of inference obtained from the current pass of data input may be same as that from the preceding one. In such a case, the operators are supplied with redundant information and may have to answer the same questions by interactively inputting unobserved data in response thereto. Instead of supporting the plant operators in their tasks, this arrangement has often proved to be counterproductive.

SUMMARY OF THE INVENTION

It is therefore an object of the present invention to provide a plant operation supporting method whereby any error of the knowledge incorporated in the system with which the method is implemented is readily detected.

It is another object of the present invention to provide a plant operation supporting method whereby it is easy to simulate plant errors for easy verification of the knowledge incorporated in the system for use with the method.

It is a further object of the present invention to provide a plant operation supporting method which allows the plant process to be continuously supervised for detection of a new error during investigation of the current error or during the stage of finding countermeasures thereagainst, and which allows an error of higher priority to override the ongoing inference process in favor of finding an appropriate emergency operation thereagainst so as to support the plant operators upon emergency.

It is an even further object of the present invention to provide a plant operation supporting method which functions as an expert system for plant error diagnosis capable of predicting an alarm based on the current status of the plant in case of the process data therefrom deviating from the normal range, the system being also capable of investigating what went wrong with the plant in case the alarm is activated.

It is another object of the present invention to provide a plant operation supporting method which forgoes investigation of the probable cause of the currently detected error when the symptom name thereof is the same as the preceding one, and which suppresses isolation of the faulty plant component when the location or name thereof is the same as the previous one even if the names of the symptoms are different. This makes it possible for the expert system to avoid duplication of the inference for higher inference efficiency, while the plant operators are spared the unwelcome supply of redundant information from the supporting system and needless interactions therewith.

According to one aspect of the present invention, there is provided a plant operation supporting method comprising two processes, one being an inferred history process for recording the stages of inference execution, the contents of the knowledge used therein and the results obtained therefrom, the other process being an inferred history output process for outputting the results recorded.

According to another aspect of the present invention, there is provided a plant operation supporting method which, given simulation data for simulating the data admitted upon plant error, infers what is wrong with the plant based on the simulation data and the knowledge incorporated therein, and causes an operation guide relevant to the error to be displayed for verification of that knowledge.

According to a further aspect of the present invention, there is provided a plant operation supporting method having an execution control means and two independently established processes which run in parallel, one of the processes causing an appropriate emergency operation to be found following detection of an error, the other process having countermeasures thereagainst found through error cause inference, the execution control means being designed to add priority data to the detected error, thereby finding an appropriate emergency operation or countermeasures thereagainst depending on the priority thereof.

According to an even further aspect of the present invention, there is provided a plant operation supporting method comprising an alarm prediction model and an inference means, the model indicating how continuous changes in process data and in plant status may be related to a future alarm state external to the method, the inference means being constructed to infer the external alarm state based on both the alarm prediction model and the qualitative characteristics of each plant component.

According to another aspect of the present invention, there is provided a plant operation supporting method comprising an alarm prediction model and two means, one means being designed to search upon error through the alarm prediction model for data constituting the probable cause thereof, the other means being constructed to investigate what went wrong based on the current process data and to find accordingly appropriate countermeasures thereagainst.

According to a further aspect of the present invention, there is provided a plant operation supporting method comprising a buffer and two means, the buffer storing the name of the error symptom inferred upon error detection, one of the means being constructed to compare the name of the error symptom detected this time with the previous error symptom name stored in the buffer, the other means being designed to suppress investigation of the probable cause of the error if the current symptom name is the same as the previous one.

According to an even further aspect of the present invention, there is provided a plant operation supporting method comprising a buffer and two means, the buffer storing the location of the error detected or the name of the faulty component inferred during investigation of the probable cause of the error, one of the means being constructed to compare the name of the error location or of the faulty component found this time with the previously detected name thereof, the other means being designed to suppress investigation of the probable cause of the error if the name of the currently detected error location or faulty component is the same as the previous one.

BRIEF DESCRIPTION OF THE DRAWINGS

FIG. 4 is a schematic diagram showing how a second embodiment of the present invention is practiced in a suitable system;

FIG. 5 is a flowchart illustrating how the plant operation supporting process in the second embodiment of FIG. 4 operates;

FIGS. 6A–B are schematic diagrams depicting how a third embodiment of the present invention is practiced in a suitable system;

FIGS. 7A–B are schematic diagrams showing how a fourth embodiment of the present invention is practiced in a suitable system;

FIGS. 8A–B are schematic diagrams illustrating how a fifth embodiment of the present invention is practiced in a suitable system;

FIG. 10 is a view depicting a typical prior art operation guide;

PREFERRED EMBODIMENT OF THE INVENTION

Figure 1:
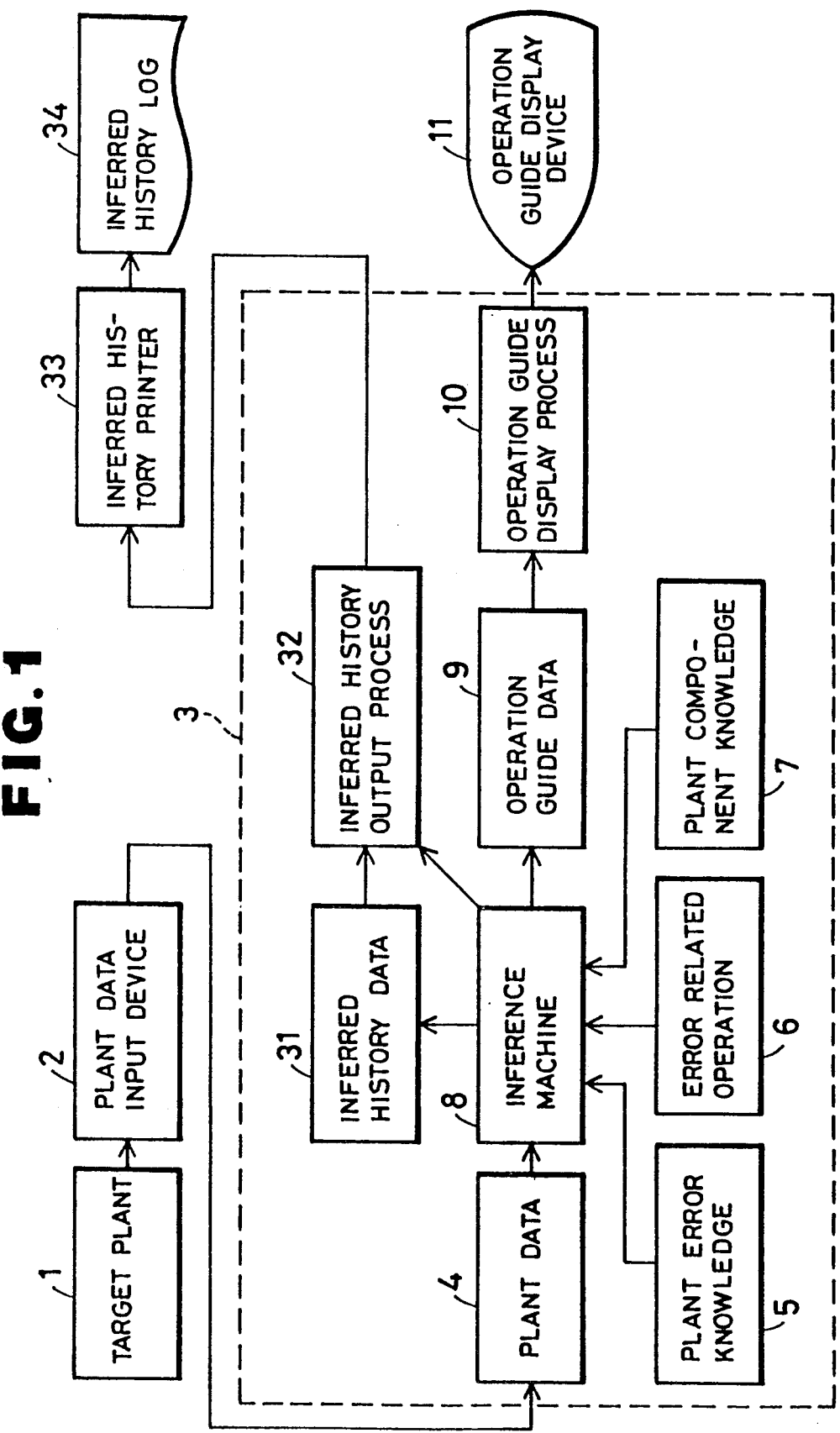
FIG. 1 is a schematic diagram showing how a plant operation supporting method is practiced in a suitable system as a first embodiment of the present invention.
Figure 9:
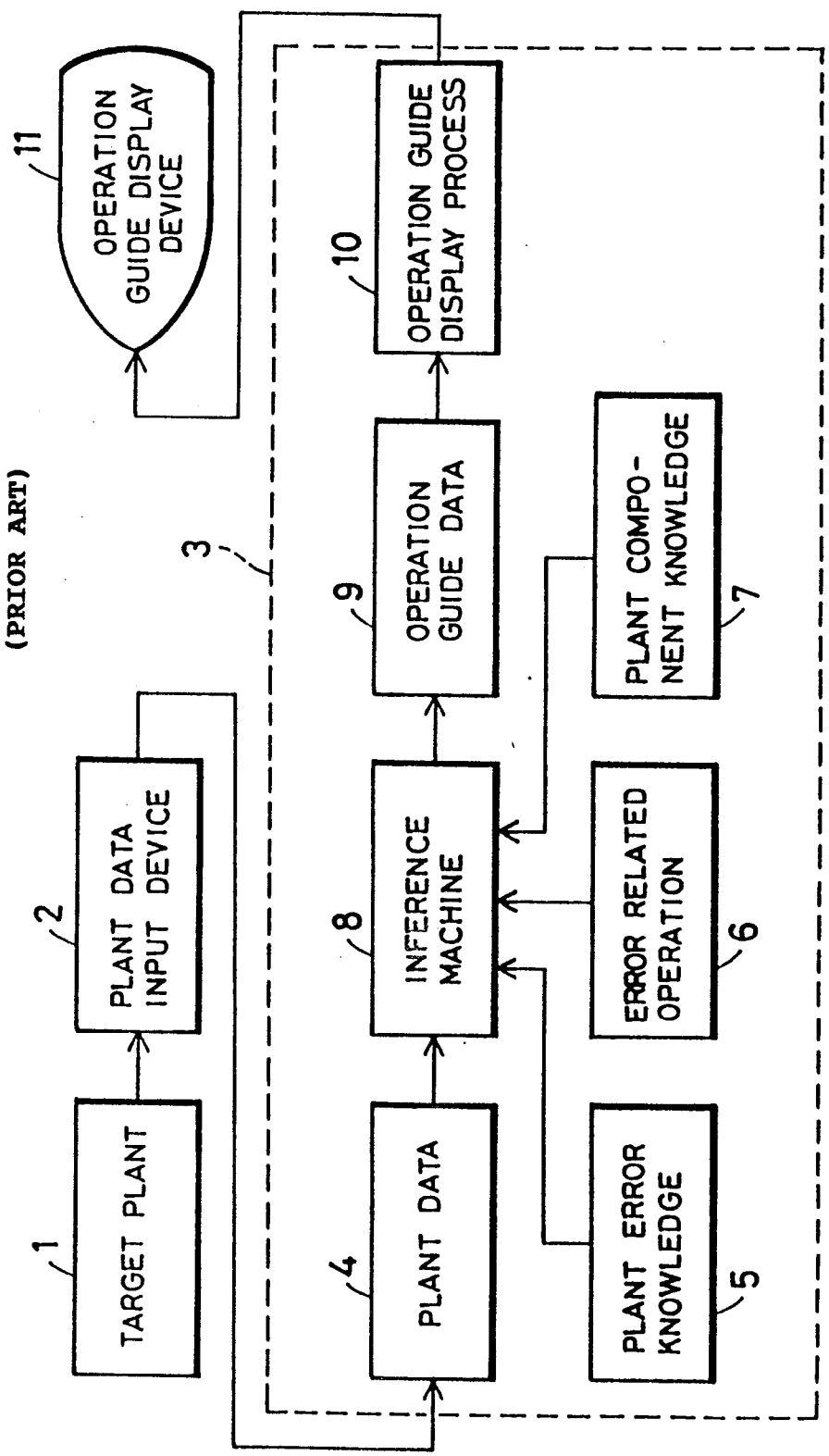
FIG. 9 is a schematic diagram showing how a prior art plant operation supporting method is practiced in a suitable system.
Figure 11:
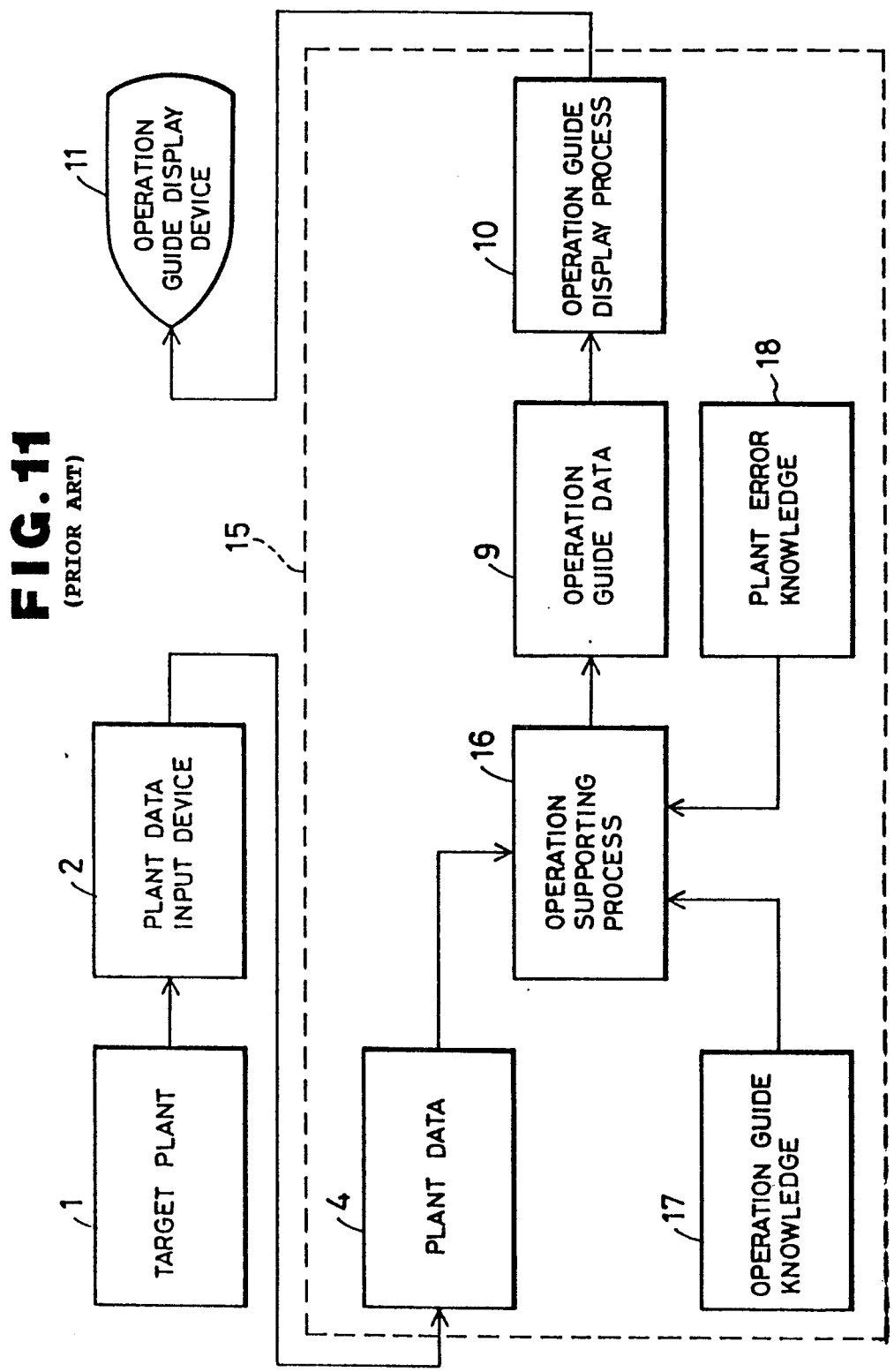
FIG. 11 is a schematic diagram illustrating how another prior art plant operation supporting method is practiced in a suitable system.

FIG. 1 shows how the plant operation supporting method according to the present invention is practiced in a suitable system as the first embodiment thereof. In FIGS. 1 and 9, like reference characters designate like or corresponding parts, and any repetitive description thereof is omitted. In FIG. 1, reference numeral 31 is a body of inferred history data resulting from the inference performed by the inference machine 8; numeral 32 is an inferred history output process that outputs the inferred history data 31; numeral 33 is an inferred history printer; and numeral 34 is an inferred history log that is output by the inferred history printer 33.

Figure 2:
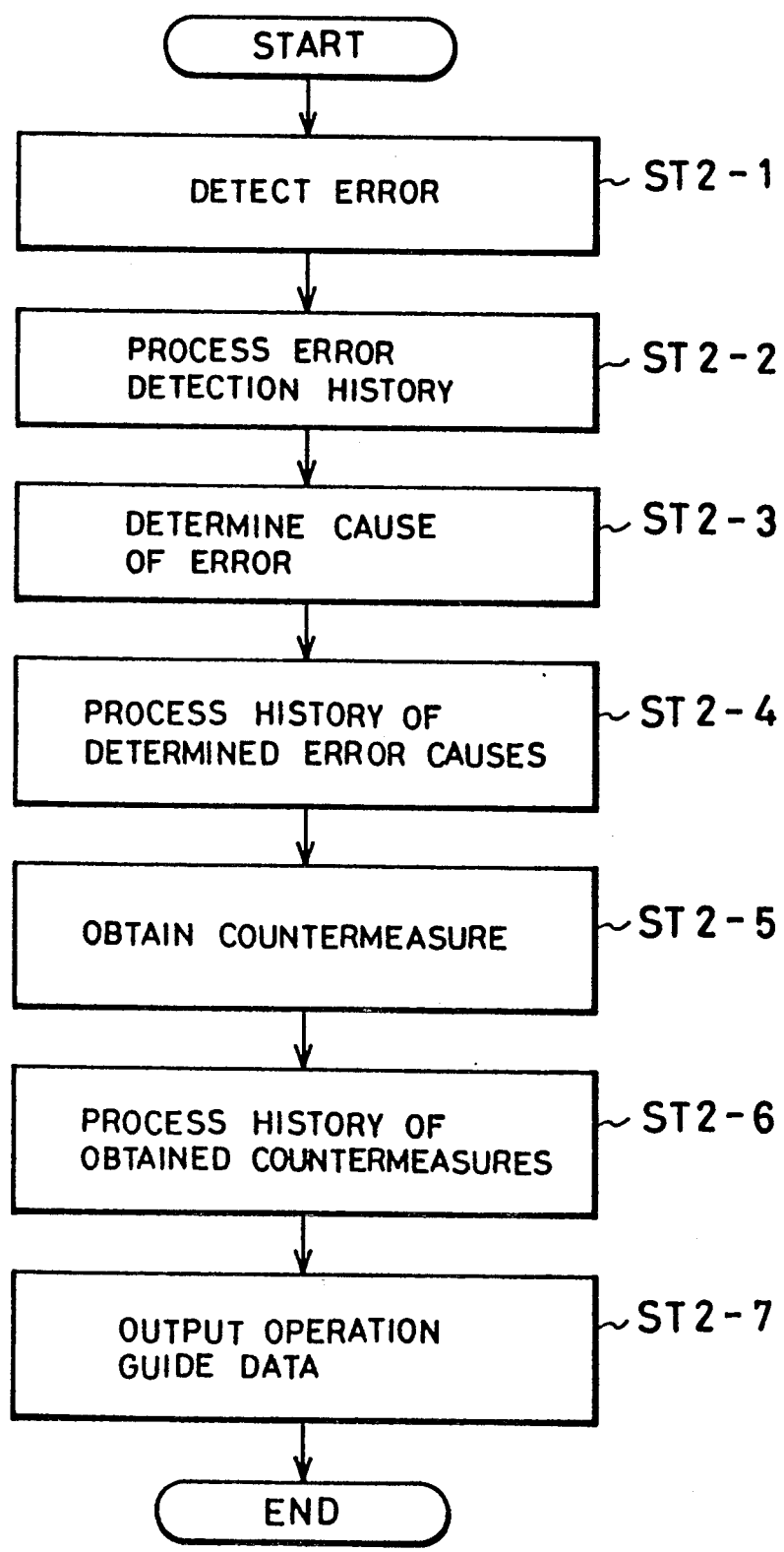
FIG. 2 is a flowchart showing how the first embodiment of FIG. 1 operates.

FIG. 2 illustrates in flowchart format how the inference engine 8 of the first embodiment operates if an error occurs in the plant 1.

Figure 3:
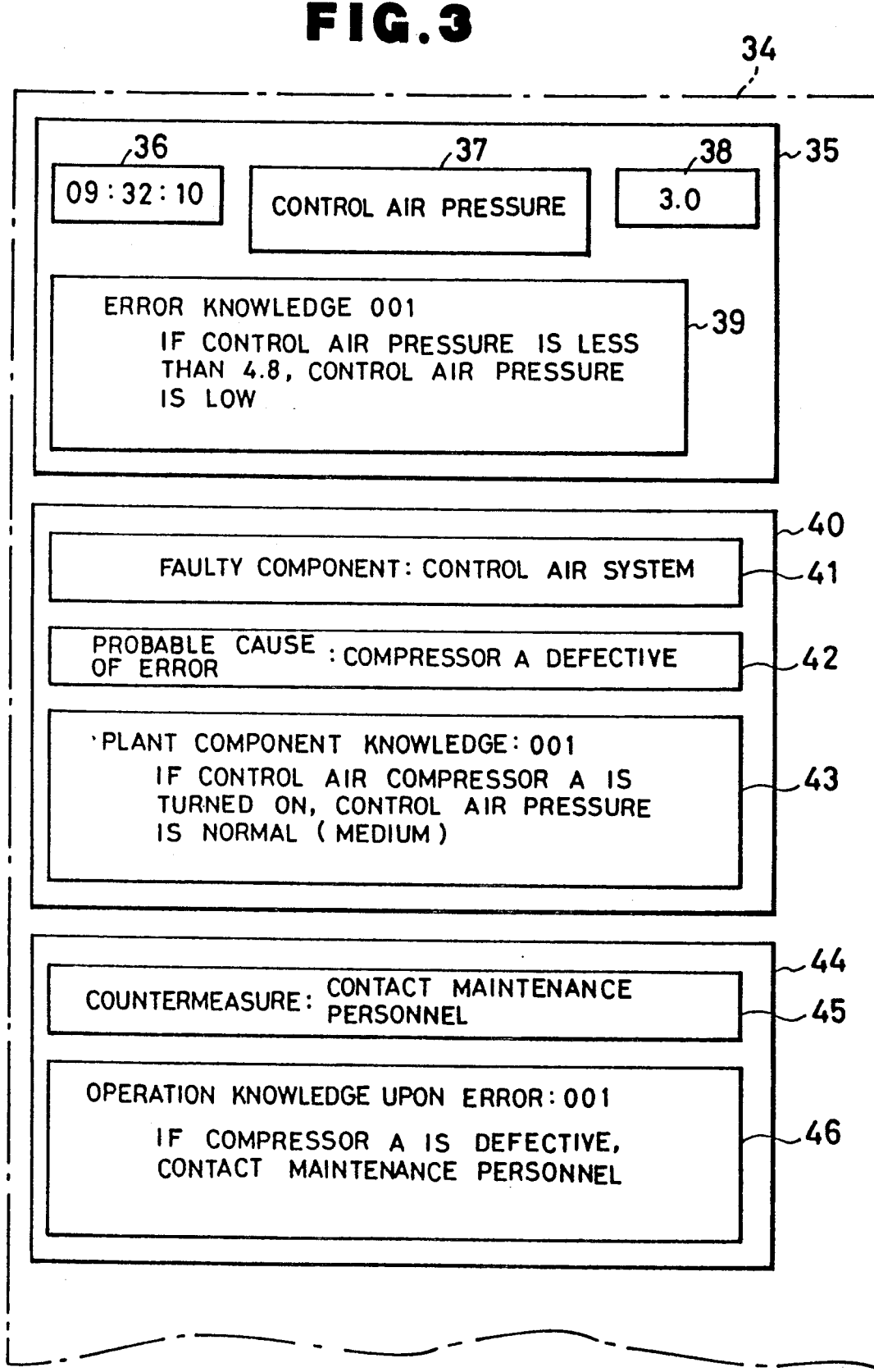
FIG. 3 is a view depicting a typical inferred history log obtained with the first embodiment.

FIG. 3 depicts an example of the inferred history log 34 obtained with the first embodiment. In FIG. 3, reference numeral 35 is an error detection log; numeral 36 is an error occurrence time; numeral 37 is a plant data name; numeral 38 is a current value; numeral 39 is a plant error knowledge that is applied; numeral 40 is an error cause log; numeral 41 is a faulty component name; numeral 42 is a cause of error; numeral 43 is a plant component knowledge that is applied; numeral 44 is a countermeasure log; numeral 45 is a countermeasure description; and numeral 46 is an operation knowledge that is applied upon error.

In operation, the error status of the plant 1 is input to the inference computer 3 by the plant data input device 3 as plant data 4. Referring to FIG. 2, the inference machine 8 detects an error in step ST2-1 (error detection step) based on the plant error knowledge 5 and on the plant data 4, and writes an error symptom message into the operation guide data 9. In step ST2-2 (error detection history processing step), the error detection log 35 comprising the error occurrence time 36, faulty plant data name 37, current value 38 and applied plant error knowledge 39 is written to the inferred history data 31, and the inferred history output process 32 is activated. When activated, the inferred history output process 32 outputs the inferred history data 31 to the inferred history printer 33 in the form of the inferred history log 34.

In step ST2-3 (error cause determination step), the probable cause of the error is determined from the plant data name written to the inferred history data 37, from the current value 38 and from the plant component knowledge 7. After the error cause message 13 is written to the operation guide data 9, step ST2-4 (determined error cause history processing step) is reached. In step ST2-4, the error cause log 40 comprising the faulty component name 41, cause of error 42 and applied plant component knowledge 43 is written to the inferred history data 31, and the inferred history output process 32 is activated. In turn, the inferred history output process 32 outputs the inferred history data 31 to the inferred history printer 33 as the inferred history log 34.

In step ST2-5 (countermeasure finding step), a countermeasure guide is obtained from the faulty component name 41 written to the inferred history data 31, from the cause of error 42 and from the error-related operation knowledge 6. After the countermeasure guide message 14 is written to the operation guide data 9, step ST2-6 (obtained countermeasure processing step) is reached. In step ST2-6, the countermeasure log 44 comprising the countermeasure guide 45 and applied error-related operation knowledge 46 is written to the inferred history data 31, and the inferred history output process 32 is activated. In turn, the inferred history output process 32 outputs the inferred history data 31 to the inferred history printer 33 as the inferred history log 34.

In step ST2-7 (operation guide data output step), the operation guide display process 10 is activated. When activated, the operation guide display process 10 outputs the operation guide data 9 to the operation guide display device 11.

As indicated, it is easy to detect knowledge-related errors from the inferred history log 34 that is output on the inferred history printer 33. Because the log is preserved as a hard copy listing, the knowledge can be verified thereby as needed.

In the first embodiment described above, the result of the inference is printed after each pass thereof. Alternatively, the result may be printed collectively after the entire process of inference has been completed. In either case, the same effects of the invention are obtained as long as the inferred history data in recorded form can be observed whenever needed.

FIG. 4 shows schematically how the second embodiment of the present invention is practiced in a suitable system. In FIGS. 1 and 4, like reference characters designate like or corresponding parts, and any repetitive description thereof is omitted. In FIG. 4, reference numeral 47 is a simulation request device such as a keyboard through which to input a request for simulation; numeral 48 is a simulation data memory; numeral 49 is a simulation process; numeral 50 is a body of simulation data established by the simulation process 49; numeral 51 is a simulation underway signal indicating that simulation is underway; numeral 52 is a data input device that may double as the simulation request device 47; and numeral 53 is a simulation data generation process.

FIG. 5 illustrates in flowchart form how the plant operation supporting process 16 of the second embodiment in FIG. 4 operates. In FIG. 5, step ST5-1 is a simulation underway signal deciding process; step ST5-2 is a plant data reading process; step ST5-3 is a simulation data reading process; step ST5-4 is a plant error deciding process; and step ST5-5 is an operation guide finding process.

In operation, simulation data is first of all generated for storage into the simulation data memory 48. A plant data name, a simulation time, and a current value in effect at that time are input through the data input device 52 to the simulation data generation process 53. In turn, the simulation data generation process 53 chronologically places the pieces of data into the simulation data memory 48.

For knowledge verification, a desired number of simulation data generated beforehand is selected through the simulation request device 47. In response, the simulation process 49 chronologically sets to the simulation data 50 the pieces of data corresponding to the numbers selected from the simulation data memory 48. At this point, the simulation underway signal 51 is turned on. If the simulation underway signal 51 is on, the plant operation supporting process 16 reads the simulation data 50 in step ST5-3 (simulation data reading step). In step ST5-4 (plant error deciding process), the plant error knowledge 18 is used to infer the status and probable cause of the error and the plant component affected thereby based on the simulation data 50. In step ST5-5 (operation guide finding process), the corresponding operation guide data 9 is obtained from the operation guide knowledge 17. The operation guide display process 10 then causes the operation guide data 9 to be displayed on the operation guide display device 11.

If the simulation underway signal is off, the plant operation supporting process 16 reads the plant data 4 in step ST5-2 (plant data reading process). In step ST5-4 (plant error deciding process), the plant error knowledge 18 is used to infer the status and probable cause of the error and the plant component affected thereby based on the plant data 4. In step ST5-5 (operation guide finding step), the corresponding operation guide data 9 is obtained from the operation guide knowledge 17. The operation guide display process 10 then causes the operation guide data 9 to be displayed on the operation guide display device 11.

In the second embodiment described above, the simulation data to be stored in the simulation data memory 48 is generated by the data input device 52 for each item of plant data. Alternatively, the simulation data may be tapped from an operator training simulator. In either case, the same effects of the invention are obtained.

Figure 12:
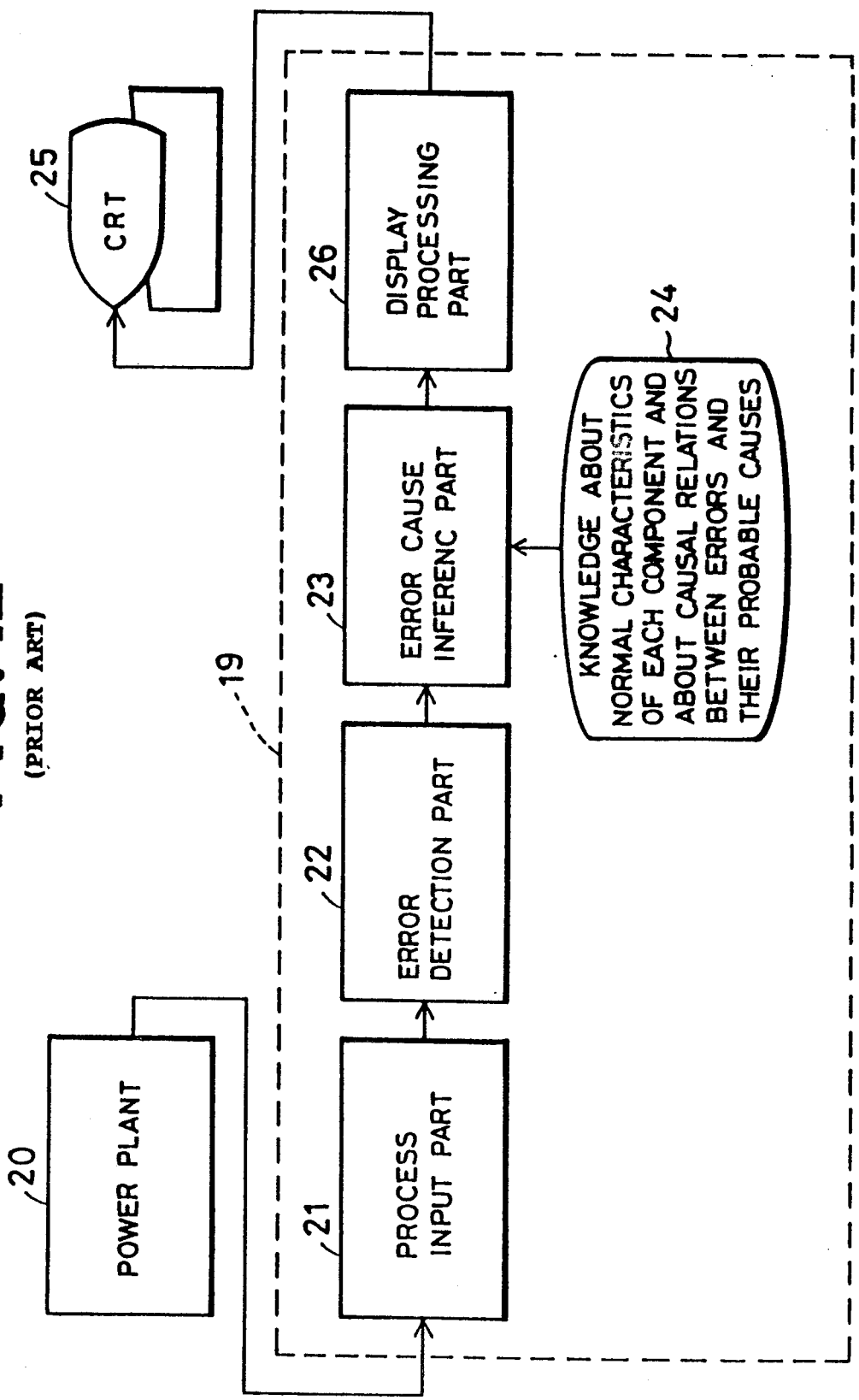
FIG. 12 is a schematic diagram showing how a further prior art plant operation supporting method is practiced in a suitable system.

FIG. 6 shows schematically how the third embodiment of the present invention is practiced in a suitable system. In FIGS. 6 and 12, like reference characters designate like or corresponding parts, and any repetitive description thereof is omitted. In FIG. 6, reference numeral 54 is an emergency priority deciding part that decides the emergency priority of the error detected; and numeral 55 is an emergency operation finding part finds an appropriate emergency operation against the probable cause of the error. Also contained in the third embodiment, as described below, are knowledge bases comprising collections of knowledge required by the supporting processes involved, a queue whereby execution thereof is requested, and buffers required for the processing.

Further in FIG. 6, reference numeral 57 is a knowledge base containing quantitative or qualitative knowledge about the normal range of process data or about normal relationships between a plurality of processes, the knowledge being supplemented by labels of priorities applicable when the plant status deviates from the normal data range or characteristics in case of plant errors, the purpose of the knowledge base being detection of such errors. Reference numeral 58 is a knowledge base comprising knowledge about correspondences between countermeasures and those probable causes of errors which are determined by the error cause inference part 23, the correspondences being used to generate countermeasure guidance. Numeral 59 is a knowledge base containing knowledge about relationships between error symptoms and corresponding emergency operations. Numeral 60 is an error cause inference request queue, the queue containing error symptom names and error data names in order of priority.

Numerals 61 and 62 are display buffers in which to store the contents to be displayed on the CRT unit 25. The first display buffer 61 stores information needed to display countermeasure guidance, and the second display buffer 62 contains information required to display emergency operation guidance.

In operation, the process input part 21 admits data from the power plant 20 and converts the data comprising process quantities into qualitative data such as "gradual increase" or "constant" for use by the error cause inference part 23. The error detection part 22 recognizes an error if the process data that was input through the process input part 21 has deviated from the applicable normal range defined in the knowledge base 57, or if a discrepancy has occurred in relationship between a plurality of processes. Priority data corresponding to the appropriate piece of knowledge is added to the name of the error symptom detected before that name is sent to the emergency priority deciding part 54.

If the priority of the detected error symptom has exceeded a predetermined value, the emergency priority deciding part 54 judges the error to have a high emergency priority, and activates the emergency operation finding part 55. In turn, the emergency operation finding part 55 retrieves from the knowledge base 49 the kind of emergency operation guidance that matches the error symptom name in question, places appropriate display data in the second display buffer 62, and executes the display processing part 26. The display processing part 26 generates an inference result message comprising the error occurrence time, error symptom name and emergency operation guidance.

If the error is judged to have a low priority, the emergency priority deciding part 54 places in the error cause inference request queue 60 the name of the error symptom and the error data name as a request for executing error cause inference. If any pieces of the above-mentioned data are found in the error cause inference request queue 60, the error cause inference part 34 retrieves these data items in order of priority. The error cause inference part 23 then infers the location of the error and the probable cause thereof by making use of each error data name and of the quantitative and qualitative process data input through the process input part 21. When the probable cause is determined, a countermeasure finding part 56 is activated. If no request is found in the error cause inference request queue 60, the error cause inference part 23 waits for data to be entered into that queue.

Using the knowledge base 58 that defines correspondences between causes of errors and their countermeasures, the countermeasure finding part 56 generates countermeasure guidance that matches the probable cause of the error detected. Then the countermeasure finding part 56 places display data in the first display buffer 61, and activates the display processing part 26 so as to display an appropriate inference result message comprising the error occurrence time, error symptom name, error location, probable cause of the error and countermeasure guidance.

In the third embodiment of the invention described above, the error cause inference part 23 includes a process for determining the error location. An alternative to this arrangement is to execute the error location determining process before the error is judged for priority. Another alternative is to provide the process input part 21, error detection part 22, error cause inference part 23, display processing part 26, emergency priority deciding part 54, emergency operation finding part 55 and countermeasure finding part 56 as an independent process each. In the third embodiment, the error cause inference part 23 uses knowledge that represents the normal characteristics of each plant component. An alternative to this arrangement is to utilize conventionally recognized causal relations between error symptoms and their probable causal for inferring the cause of a given error. Another alternative is that execution of the error cause inference part 23 is to be requested following execution of the emergency operation finding part 55, with the same results obtained. The third embodiment uses the CRT unit 25 to give the plant operators necessary information. Alternatively, the CRT may be replaced by a printer or a voice output device that provides the same effect.

FIG. 7 shows schematically how the fourth embodiment of the present invention is practiced in a suitable system. In FIGS. 7 and 6, like reference characters designate like or corresponding parts, and any repetitive description thereof is omitted. In FIG. 7, reference numeral 63 is a knowledge base that comprises quantitative or qualitative knowledge about the normal range of process data or about normal relationships between a plurality of processes, the purpose of the knowledge base being detection of plant errors; numeral 64 is a triggering process finding part for finding the name of the process that triggered an external alarm recognized by an alarm deciding part 74; numeral 65 is a knowledge base that contains knowledge about causal relations between trends of changes in process data and alarms; numeral 66 is a queue in which to place, as a request for error spread alarm prediction, the process data name found by the triggering process finding part 64; and numeral 67 is an error spread alarm prediction part which finds the plant component directly affecting process data, the component being found by the triggering process finding part 64, in order to predict a future alarm state stemming from the current error by use of the affected plant component as a starting point and by employing the knowledge bases 24 and 65, the knowledge base 24 comprising knowledge about qualitative characteristics of the component in question, the knowledge base 65 containing knowledge about causal relations between trends of changes in process data and alarms.

In operation, the process input part 21 admits data from the power plant 20 and converts the data comprising process quantities into qualitative data such as "gradual increase" or "constant"for use by the error cause inference part 23. The error detection part 22 recognizes an error if the process data that was input through the process input part 21 has deviated from the applicable normal range or is different from the normal relationships between a plurality of processes, the range and relationships being defined in the knowledge base 63. The name of the applicable error symptom is forwarded to the alarm deciding part 74. If the detected error symptom is judged to warrant an alarm, the alarm deciding part 74 executes the triggering process finding part 64 to find the name of the process data that triggered the alarm. The alarm deciding part 74 then places the data name applicable to the erroneous process in the error spread alarm prediction request queue 66, and executes the error spread alarm prediction part 67.

In turn, the error spread alarm prediction part 67 retrieves the data name of the process from the error spread alarm prediction request queue 66, obtains from the knowledge base 24 the name of the plant component directly affecting the process, and finds from the knowledge base 65 a predicted alarm that matches the trend of changes in the applicable process data, the knowledge base 65 containing knowledge about causal relations between trends of changes in process data and alarms.

Thereafter, the error spread alarm prediction part 67 searches the knowledge base 24 for propagative inference of the trends of continuous changes in process data based on causal relations between qualitative characteristics and error symptoms, the knowledge base comprising knowledge about the normal characteristics of each plant component. With the trend of the changes in the applicable process detected, the knowledge base 65 is tapped and an error spread alarm corresponding to that trend is obtained therefrom for each responsible plant component, the knowledge base containing knowledge about causal relations between trends of changes in process data and alarms.

The error spread alarm prediction part 67 then executes the error cause inference part 23 after placing in the error cause inference request queue 60 either the data name of the process that triggered the error or the error detected by the error detection part 22. The error cause inference part 23 retrieves from the error cause inference request queue 60 the data name representing the error. The location and probable cause of the error are inferred by use of the data name and of the qualitative and quantitative process data that was input through the process input part 21. If the probable cause is found, the countermeasure finding part 56 is executed. If no execution request is retrieved from the error cause inference request queue 60, the error cause inference part 23 waits for execution request data to be placed in the queue.

The countermeasure finding part 56 executes the display processing part 26 after generating countermeasure guidance that matches the probable cause of the error determined by referring to the knowledge base 58, the knowledge base comprising knowledge about the relations between causes of errors and their countermeasures. An inference result message comprising the error occurrence time, error symptom name, error location name, cause of error and countermeasure guidance is displayed.

In the fourth embodiment of the invention described above, the error cause inference part 23 is executed after the error spread alarm prediction part has been executed. An alternative to this arrangement is to reverse the two parts in order of execution. A further alternative is to have the two parts executed in parallel.

In the fourth embodiment, the CRT unit 25 is used to provide the plant operators with relevant information. An alternative to this arrangement is to replace the CRT with a printer or a voice output device, with the same results obtained. The fourth embodiment has two functions, one function being designed to predict an external alarm based on the detected error symptom, the other function being constructed to investigate the probable cause of the error upon external alarm. Alternatively, there is no need to input an external alarm contact signal if only external alarms need to be predicted; in that case, the part for finding probable causes of errors may also be omitted.

FIG. 8 depicts schematically how the fifth embodiment of the present invention is practiced in a suitable system. In FIGS. 8 and 7, like reference characters designate like or corresponding parts, and any repetitive description thereof is omitted. In FIG. 8, reference numeral 68 is a first inference result buffer that stores the name of the error symptom detected by the error detection part 22; numeral 69 is a faulty component finding part that finds an error location or a faulty plant component containing the cause of the error by referring to the knowledge base 24, the reference being made to the body of knowledge which is provided to each plant component and which comprises the qualitative and quantitative characteristics thereof in normal state; numeral 70 is an error cause finding part that finds the probable cause of the error in an error location or a faulty plant component by referring to the knowledge base 24, the reference being made to the body of knowledge about the causal relations between error symptoms and their probable causes; numeral 71 is a faulty component matching part that checks to see if the faulty component currently detected by the error cause inference part 23 is the same as the previously detected faulty component; numeral 72 is a second inference result buffer that stores the name of the error location or faulty component found by the error cause inference part 23; and numeral 73 is an error symptom matching part that checks to see if the currently detected error symptom is the same as the previously detected symptom.

In operation, the process input part 21 admits data from the power plant 20 and converts the data comprising process quantities into qualitative data such as "gradual increase" or "constant" for use by the error cause inference part 23. The error detection part 22 recognizes an error if the process data that was input through the process input part 21 has deviated from the applicable normal range defined in the knowledge base 63. The name of the applicable error symptom is forwarded to the error symptom matching part 73.

Meanwhile, the first inference result buffer 68 contains the name of the previously detected error symptom. The error symptom matching part 73 compares the contents of the first inference result buffer 68 with the name of the error symptom detected by the error detection part 22. If the comparison results in a match, the processing is terminated without execution of the error cause inference part 23; if there is a mismatch, the error cause inference part 23 is executed, followed by storage of the name of the current error symptom into the first inference result buffer 68.

The error cause inference part 23 activates the faulty component finding part 69 to find the error location or faulty plant component containing the cause of the error. This action is followed by activation of the error cause finding part 70 that finds the probable cause of the error in the error location or faulty plant component, only if the faulty component matching part 71 finds it necessary to activate the part 70.

The faulty component finding part 69 finds an error location or faulty component containing the cause of the error by referring to the knowledge base 24, the reference being made to the body of qualitative or quantitative knowledge about the characteristics of each plant component in normal state. The name of the error location or faulty component found in this manner is placed in the second inference result buffer 72.

The faulty component matching part 71 compares the contents of the second inference result buffer 72 with the name of the error location or faulty component found by the faulty component finding part 69 in the error cause inference part 23. If the comparison results in a match, the processing is terminated without execution of the error cause finding part 70; if there is a mismatch, the error cause finding part 70 is executed, followed by storage of the name of the error location or faulty plant component in question into the second inference result buffer 72.

When prompted by the faulty component matching part 71 into action, the error cause finding part 70 finds the probable cause of the error in the error location or faulty component by referring to the knowledge base 24, the reference being made to the body of knowledge about causal relations between causes of errors and symptoms. The name of the probable cause thus obtained is sent to the countermeasure finding part 56, which is then executed.

The countermeasure finding part 56 generates countermeasure guidance that corresponds to the probable cause of the error by referring to the knowledge base 58, the base defining the relations between causes of errors and their countermeasures. The display processing part 26 is then executed to display an inference result message comprising the error occurrence time, error symptom name, name of error location or faulty component, name of probable cause, and countermeasure guidance.

The fifth embodiment of the invention described above uses two means in combination: one means for suppressing investigation of the probable cause of the current error if the symptom thereof is the same as the previously detected symptom, and the other means for forgoing identification of the probable cause of the current error if the name of the currently detected error location or faulty component is the same as the previously obtained name. Although the two means combinedly used provide many advantages, either one of the means still provides sufficient benefits when used singly. The fifth embodiment utilizes the CRT unit 25 to provide the plant operators with relevant information. Alternatively, the CRT may be replaced by a printer or a voice output device, with the same results obtained.

As indicated, one benefit of the present invention is that because the data and knowledge used during inference are recorded and output, any error in the knowledge can be known easily.

Another benefit of the present invention is that the ability to verify the incorporated knowledge through the use of various simulation data improves the reliability of operation guides presented to the plant operators. Since verification of the knowledge does not require an embodiment of the invention to be an integral part of the target plant, the test run period thereof may be shortened.

A further benefit of the present invention is that relevant support information is available to the plant operators as the plant status varies in the course of operation. That is, the process for detecting plant errors, the process for inferring the probable causes thereof, and the process for finding the countermeasures thereagainst are made functionally independent of one another. Furthermore, the knowledge for error detection is supplemented by labels of emergency priorities given to each error upon occurrence thereof, a sufficiently high priority causing a relevant emergency operation to be found in a timely manner. This makes it possible to keep monitoring the plant processes for a new error while the probable cause of the current error is being investigated or a countermeasure thereagainst is being obtained. Emergency operation guidance is thus presented to the plant operators depending on the emergency priority of the newly detected error.

An even further benefit of the present invention is that it is possible to predict a future alarm state based on the current operation status, thereby supporting the plant operators in taking action prior to an external alarm expected to occur in the future, in judging the urgency of the current error, and in fully appreciating the result of the inference. This is accomplished by providing the knowledge base containing knowledge about causal relations between the trends of changes in process data and alarms. The knowledge base is tapped by the plant error diagnosis expert system for the causal relations between the current trend of changes in the data from the error process and the applicable alarm, such alarm being presented as the alarm expected to occur in the future.

Another benefit of the present invention is that the probable cause of the present error or the countermeasure thereagainst can be obtained not only when the process data has deviated from the applicable normal range but also when an external alarm takes place. This is accomplished by providing the knowledge base containing knowledge about causal relations between trends of changes in process data and alarms, the base being tapped to find a relationship between the current trend of changes in the process data and the alarm expected to occur if the trend continues, the relationship being used to obtain the process data that triggered the external alarm and the plant component that directly caused the alarm, the process data and component name providing a starting point from which to search through qualitative characteristics of plant components in order to find the exact component containing the error.

A further benefit of the present invention is the elimination of duplicate efforts by the system asking questions about inference execution and about the input of unobserved data. That is, the name of each error symptom obtained through inference upon error detection is retained for comparison with the name of the newly detected error symptom. If the current error symptom name is the same as the previous name, investigation of the probable cause of the error is suppressed. For example, there is a system in which process data is input at relatively short intervals for error diagnosis. In this case, insignificant changes in the process data between two passes of inference spare the diagnostic system from asking duplicate questions every time about inference processes and about the input of unobserved data. This not only improves the efficiency of inference but also allows the operators to do away with the redundant supply of information from and unnecessary interaction with the diagnostic system.

An even further benefit of the present invention is the elimination of duplicate efforts by the system asking questions about inference processes and about the input of unobserved data as well as presenting operation guides for identification of the probable cause of error. This is accomplished by retaining the name of the current error location or faulty plant component inferred, the name being compared with the previously inferred name; if the comparison results in a match, investigation of the probable cause of the current error is suppressed. In this setup, insignificant changes in the process data between two passes of inference spare the diagnostic system from asking duplicate questions every time about inference processes and about the input of unobserved data, and also spare the system from presenting operation guides for investigation of the probable cause of error. This not only improves the efficiency of inference but also allows the operators to do away with the redundant supply of information from and unnecessary interaction with the diagnostic system.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A plant operation support apparatus for monitoring input process data from a plant to detect errors in the plant, and for providing a countermeasure process guide relating to the cause of error for the use of a plant operator or maintenance personnel, said apparatus comprising:

error detecting means for detecting error in the plant based upon process data from the plant;

error cause inference means for determining the cause of the error;

countermeasure determining means for outputting a countermeasure against the cause of the error determined by said error cause inference determining means;

emergency operation determining means for outputting an emergency operation against said cause of error; and emergency priority determining means for judging the priority level of the detected error, and for signaling said emergency operation determining means when the detected error is of a selected high priority level;

wherein said error detecting means includes a first knowledge base storing knowledge concerning the normal range of each process data and the priority level of each error event, and error detecting means for detecting errors in the plant by comparing process data which is inputted from the plant with stored data on normal ranges of values stored in said first knowledge base, means for determining priority level by using knowledge stored in said first knowledge base and outputting said priority level and an error event name;

said error cause inference means including a second knowledge base storing knowledge on the characteristics of components of the plant in its normal condition and each cause and effect inter-relating each error and the cause of the error, and error cause inference means for inferring the cause of error by using knowledge stored in said second knowledge base;

said countermeasure determining means including a third knowledge base storing knowledge on each relationship between each cause of error and countermeasures against such error, and an emergency operation finding means for obtaining countermeasures for addressing the determined error by using knowledge stored in said third knowledge base; and said emergency operation finding means including a fourth knowledge base storing knowledge as to each relationship between each cause of error and the emergency operation pertaining thereto, and an emergency operation finding means for obtaining an emergency operation for addressing the determined error by using the knowledge stored in said fourth knowledge base.

2. A plant operation support apparatus for monitoring input process data from the plant to detect errors in the plant and for providing a countermeasure process guide against the cause of error for a plant operator or maintenance personnel, said apparatus comprising:

error detecting means for detecting errors in the plant based on process data from the plant;

alarm determining means for determining whether the detected error justifies an alarm signal;

prediction means for obtaining predicted alarms for determining the trend of the changes in the process data on which the alarms are based; and error cause inference means for determining the cause of error in the plant wherein said error detecting means includes a first knowledge base storing knowledge as to the normal range of process data for each process, and error detecting mens for detecting errors in the plant by comparing process data inputted from the plant with the normal range stored in said first knowledge base;

said error cause inference means including a second knowledge base storing knowledge as to characteristics of components of the plant in the normal state and each cause and effect between each error and the cause of such error, and including an error cause inference portion for inferring the cause of error by using knowledge stored in said second knowledge base; and said predicting means including a third knowledge base storing knowledge as to the trend of change in each of the process data, and each cause and effect between said trend of change and each of said process data, and a triggering process finding portion for determining the name of the process data causing the alarm determined by the alarm deciding portion, by using knowledge stored in said third knowledge base, and a spread alarm prediction portion for finding the plant component or components affecting the process data that caused the error and inferring the trend of the changes in the process data of the affecting components and predicting alarms suitable for trends of changes in the found process data.

3. A plant operation support apparatus for monitoring input process-data from the plant to detect errors in the plant and provide a countermeasure guide against the cause of the error for a plant operator or maintenance personnel, said apparatus comprising:

error detecting means for detecting error in the plant based on process data from the plant;

error cause inference means for determining cause of the error; and a checking portion for checking whether current error in the plant is the same as a previous error and activating said cause inference means if the current error and the previous error are the same wherein said error detecting means includes a first knowledge base storing knowledge as to the normal range of each of the process data, and an error detecting portion for detecting errors in the plant by comparing the process data inputted from the plant with the normal ranges stored in said first knowledge base; and said error cause inference means including a second knowledge base storing knowledge as to the characteristics of the components of the plant in the normal state and each cause and effect between each error and the cause of the error, and an error cause inference portion for inferring the cause of the error by using knowledge stored in said second knowledge base.

* * * * *

UNITED STATES PATENT AND TRADEMARK OFFICE
CERTIFICATE OF CORRECTION

PATENT NO. : 5,315,502
DATED : May 24, 1994
INVENTOR(S) : Kenji Koyama et al.

It is certified that error appears in the above-identified patent and that said Letters Patent is hereby corrected as shown below:

Col. 2, line 4, after "supporting" insert --method--.

Col. 9, line 54, "causal" should be --causes--.

Signed and Sealed this

Twenty-seventh Day of September, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,315,502
DATED : May 24, 1994
INVENTOR(S) : Kenji Koyama et al.

It is certified that error appears in the above-identified patent and that said Letters Patent is hereby corrected as shown below:

Fig 6B, Box 61, "DISTPLAY" should be --DISPLAY--.

Fig. 12, Box 23, "INFERENC" should be --INFERENCE--.

Signed and Sealed this

Twenty-fourth Day of January, 1995

Attest:

BRUCE LEHMAN

*Attesting Officer*    *Commissioner of Patents and Trademarks*